US012779340B2

(12) United States Patent
Kurabayashi

(10) Patent No.: US 12,779,340 B2
(45) Date of Patent: Nov. 3, 2026

(54) METHOD, PROGRAM, SYSTEM, AND SERVER FOR PROGRAM VERIFICATION

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 735 days.

(21) Appl. No.: 17/932,521

(22) Filed: Sep. 15, 2022

(65) Prior Publication Data

US 2023/0016371 A1 Jan. 19, 2023

Related U.S. Application Data

(63) Continuation of application No. PCT/JP2021/009342, filed on Mar. 9, 2021.

(30) Foreign Application Priority Data

Mar. 19, 2020 (JP) ................................ 2020-049336

(51) Int. Cl.
*A63F 13/73* (2014.01)
*A63F 13/60* (2014.01)
*A63F 13/75* (2014.01)
*A63F 13/77* (2014.01)

(52) U.S. Cl.
CPC .............. *A63F 13/73* (2014.09); *A63F 13/60* (2014.09); *A63F 13/75* (2014.09); *A63F 13/77* (2014.09)

(58) Field of Classification Search
CPC .......... A63F 13/73; A63F 13/60; A63F 13/75; A63F 13/77; A63F 13/335; A63F 13/70; G06F 11/36
USPC ............................................................ 463/42
See application file for complete search history.

(56) References Cited

U.S. PATENT DOCUMENTS

2021/0046384 A1 2/2021 Kurabayashi

FOREIGN PATENT DOCUMENTS

JP 2019193702 A 11/2019

OTHER PUBLICATIONS

International Search Report issued in International Application No. PCT/JP2021/009342, mailed May 25, 2021 (5 pages).
Written Opinion issued in International Application No. PCT/JP2021/009342; Dated May 25, 2021 (3 pages).

*Primary Examiner* — Michael C Grant
(74) *Attorney, Agent, or Firm* — Osha Bergman Watanabe & Burton LLP

(57) ABSTRACT

Provided are a method, program, system, and server for verifying a game program. Provided is a method executed by a system for verifying a game program for executing a collaborative game with another player by using a deck including a plurality of game media, wherein a deck set includes a plurality of decks, a deck combination is a combination of decks used to execute one collaborative game, and a deck combination set includes a plurality of deck combinations. The method includes: executing the game program in a plurality of virtual instances generated in order to virtualize a user terminal for playing the game or the software environment of the user terminal; executing the collaborative game in a first mode until a predetermined verification coverage is reached; and executing the collaborative game in a second mode after the predetermined verification coverage has been reached.

9 Claims, 7 Drawing Sheets

METHOD, PROGRAM, SYSTEM, AND SERVER FOR PROGRAM VERIFICATION

TECHNICAL FIELD

The present invention relates to a method, program, system, and server for verifying a program, more specifically a game program.

BACKGROUND ART

In recent years, there have been widely popular online games that run on general-purpose electronic devices, such as smartphones and PCs, and communicate with servers through open networks, thereby entertaining users in the form of collaborative games, such as a battle game with another user. In a well-known type of such online games, many game media, such as cards, are prepared, and players fight a battle by using decks including a plurality of game media selected by the players from the prepared game media. Because there is risk of a problem occurring and the winning rate being biased depending on the deck combination used in the battle, it is necessary to verify the behavior of the game program as software by taking deck combinations into account.

CITATION LIST

Patent Literature

{PTL 1}

Japanese Unexamined Patent Application, Publication No. 2019-193702

SUMMARY OF INVENTION

Technical Problem

A well-known method for such verification is software testing. Because the coverage of a manual software test is narrow, it is a big challenge to carry out a test involving a huge number of possible deck combinations from a large number of game media. In addition, the game applications running on, for example, servers and smartphones used for the game should be desirably verified in a state as close as possible to the actual environment. PTL 1 discloses a virtualization technology for allowing high-speed, concurrent execution of game applications on a server side in a state close to the actual environment. However, PTL 1 merely discloses a system for verifying whether or not game players are involved in wrongdoings, such as tampering with game data, and thus a system that can comprehensively verify the validity of the behavior of a game program based on many deck combinations has not been realized.

Solution to Problem

The present invention has been conceived in light of the above-described circumstances and has the following features. Specifically, a method according to one embodiment of the present invention is a method executed by a system for verifying a game program for executing a collaborative game with another player by using a deck including a plurality of game media, wherein a deck set includes a plurality of decks, a deck combination is a combination of decks used to execute one battle, and a deck combination set includes a plurality of deck combinations, said method comprising: a step of executing the game program by using a plurality of virtual instances generated to virtualize a user terminal for playing the collaborative game or a software environment of the user terminal; a step of executing the collaborative game in a first mode until a predetermined verification coverage is reached; and a step of executing the collaborative game in a second mode after the predetermined verification coverage has been reached. Here, the step of executing the collaborative game in a first mode until a predetermined verification coverage is reached includes a step of placing, into a collaborative-game startable state, game states of virtual instances that are assigned decks included in the deck set, a step of determining pairs of virtual instances for executing the collaborative game from the virtual instances placed into the collaborative-game startable state, a step of executing the collaborative game by using the virtual instances in each of the determined pairs and generating a collaborative game result including the deck combination used in the collaborative game, a step of determining whether or not the predetermined verification coverage has been reached on the basis of the deck combination set and the collaborative game results, and a step of repeatedly executing, until it is determined that the predetermined verification coverage is reached, the steps of placing game states of virtual instances into the collaborative-game startable state, determining pairs of virtual instances, generating collaborative game results, and determining whether or not the predetermined verification coverage has been reached. In addition, the step of executing the collaborative game in a second mode after the predetermined verification coverage has been reached includes a step of determining pairs of virtual instances for executing the collaborative game, a step of assigning each of the decks in unverified deck combinations determined on the basis of the deck combination set and the collaborative game results to each of the virtual instances in the determined pairs, a step of placing the game states of the virtual instances in one of the determined pairs into the collaborative-game startable state, and a step of executing the collaborative game by using the virtual instances in the one pair placed into the collaborative-game startable state and generating a collaborative game result including the deck combination used in the collaborative game.

In addition, the collaborative game executed by using the virtual instances may be executed such that at least graphic processing and sound processing are disabled as a result of the game program in each of the virtual instances being executed in a headless mode.

In the step of executing the collaborative game in a first mode, the step of determining a plurality of pairs of virtual instances may include at least one of determining the plurality of pairs of virtual instances on the basis of random numbers, determining the plurality of pairs of virtual instances by sequentially selecting virtual instances in the order in which the game states of virtual instances are placed into the collaborative-game startable state, and determining the plurality of pairs of virtual instances on the basis of a priority associated with each of the virtual instances.

In the step of executing the collaborative game in a second mode: the step of placing the game states of the virtual instances in one of the determined pairs into the collaborative-game startable state may include placing the game states of the virtual instances in one of the determined pairs into the collaborative-game startable state at predetermined time intervals; and the step of executing the collaborative game by using the virtual instances in the one pair placed into the collaborative-game startable state includes determining, as a pair for executing the collaborative game, the virtual instances in the one pair placed into the collaborative-game startable state during the predetermined time interval.

The step of executing the collaborative game in a second mode may include repeatedly executing, until all deck combinations satisfy a verification completion condition, the steps of: determining pairs of virtual instances; assigning decks to the virtual instances; placing the game states of the virtual instances into the collaborative-game startable state; and generating a collaborative game result.

The verification completion condition for a deck combination may include executing the collaborative game a predetermined number of times by using the deck combination.

The predetermined verification coverage may be determined on the basis of a verification completion rate obtained by dividing the number of times the collaborative game has been executed by the number of times the collaborative game should be executed, and if the collaborative game for a deck combination is executed more than the number of times specified in the verification completion condition for the deck combination, the number of times the collaborative game is executed is calculated as if the collaborative game were executed the number of times specified in the verification completion condition.

The step of executing the collaborative game by using the virtual instances may include executing the collaborative game by using a learning model generated from a play history of a player.

A program according to one embodiment of the present invention can be a program causing at least one computer to execute the above-described method.

A system according to one embodiment of the present invention is a system for verifying a game program for executing a collaborative game with another player by using a deck including a plurality of game media, wherein a deck set includes a plurality of decks, a deck combination is a combination of decks used to execute one collaborative game, and a deck combination set includes a plurality of deck combinations, said system comprising: a functional unit for executing the game program by using a plurality of virtual instances generated to virtualize a user terminal for playing the collaborative game or a software environment of the user terminal; a functional unit for executing the collaborative game in a first mode until a predetermined verification coverage is reached; and a functional unit for executing the collaborative game in a second mode after the predetermined verification coverage has been reached. Here, the functional unit for executing the collaborative game in a first mode until a predetermined verification coverage is reached places, into a collaborative-game startable state, game states of virtual instances that are assigned decks included in the deck set, determines pairs of virtual instances for executing the collaborative game from the virtual instances placed into the collaborative-game startable state, executes the collaborative game by using the virtual instances in each of the determined pairs and generates a collaborative game result including the deck combination used in the collaborative game, determines whether or not the predetermined verification coverage has been reached on the basis of the deck combination set and the collaborative game results, and repeatedly executes, until it is determined that the predetermined verification coverage is reached, processing for placing game states of virtual instances into the collaborative-game startable state, determining pairs of virtual instances, generating collaborative game results, and determining whether or not the predetermined verification coverage has been reached. In addition, the functional unit for executing the collaborative game in a second mode after the predetermined verification coverage has been reached determines pairs of virtual instances for executing the collaborative game, assigns each of the decks in unverified deck combinations determined on the basis of the deck combination set and the collaborative game results to each of the virtual instances in the determined pairs, places the game states of the virtual instances in one of the determined pairs into the collaborative-game startable state, and executes the collaborative game by using the virtual instances in the one pair placed into the collaborative-game startable state and generates a collaborative game result including the deck combination used in the collaborative game.

The system further includes a game server, a management server, and a virtual instance server. Here, the virtual instance server executes the game program by using a plurality of virtual instances generated to virtualize a user terminal for playing the game or a software environment of the user terminal. In executing the collaborative game in the first mode, the management server places, into a collaborative-game startable state, game states of virtual instances that are assigned decks included in the deck set, the game server determines pairs of virtual instances for executing the collaborative game from the virtual instances placed into the collaborative-game startable state, executes the collaborative game by using the virtual instances in each of the determined pairs, and generates a collaborative game result including the deck combination used in the collaborative game, and the management server determines whether or not the predetermined verification coverage has been reached on the basis of the deck combination set and the collaborative game results. In executing the collaborative game in the second mode, the management server determines pairs of virtual instances for executing the collaborative game, assigns each of the decks in unverified deck combinations determined on the basis of the deck combination set and the collaborative game results to each of the virtual instances in the determined pairs, and places the game states of the virtual instances in one of the determined pairs into the collaborative-game startable state, and the game server executes the collaborative game by using the virtual instances in the one pair placed into the collaborative-game startable state and generates a collaborative game result including the deck combination used in the collaborative game.

A management server according to one embodiment of the present invention is a management server for verifying a game program for executing a collaborative game with another player by using a deck including a plurality of game media, wherein a deck set includes a plurality of decks, a deck combination is a combination of decks used to execute one collaborative game, a deck combination set includes a plurality of deck combinations, and the game program is executed in a virtual instance server by using a plurality of virtual instances generated to virtualize a user terminal for playing the collaborative game or a software environment of the user terminal, said management server comprising: a functional unit for executing the collaborative game in a first mode until a predetermined verification coverage is reached; and a functional unit for executing the collaborative game in a second mode after the predetermined verification coverage has been reached. Here, the functional unit for executing the collaborative game in a first mode places, into a collaborative-game startable state, game states of virtual instances that are assigned decks included in the deck set, determines whether or not the predetermined verification coverage has been reached on the basis of a collaborative game result and the deck combination set, said collaborative game result being generated when the collaborative game is executed by using the virtual instances in each of the pairs of virtual instances determined in order to execute the collaborative game from the virtual instances placed into the collaborative-game startable state and said collaborative game result including the deck combination used in the collaborative game, and repeatedly executes, until it is determined that the predetermined verification coverage is reached, processing for placing game states of virtual instances into the collaborative-game startable state and determining whether or not the predetermined verification coverage has been reached. In addition, the functional unit for executing the collaborative game in a second mode determines pairs of virtual instances for executing the collaborative game, assigns each of the decks in unverified deck combinations determined on the basis of the deck combination set and the collaborative game results to each of the virtual instances in the determined pairs, and places the game states of the virtual instances in one of the determined pairs into the collaborative-game startable state.

Advantageous Effects of Invention

According to the present invention, it is possible to realize a game program verification system capable of efficiently and comprehensively verifying many deck combinations by executing collaborative games in two modes.

DESCRIPTION OF EMBODIMENTS

Figure 1:
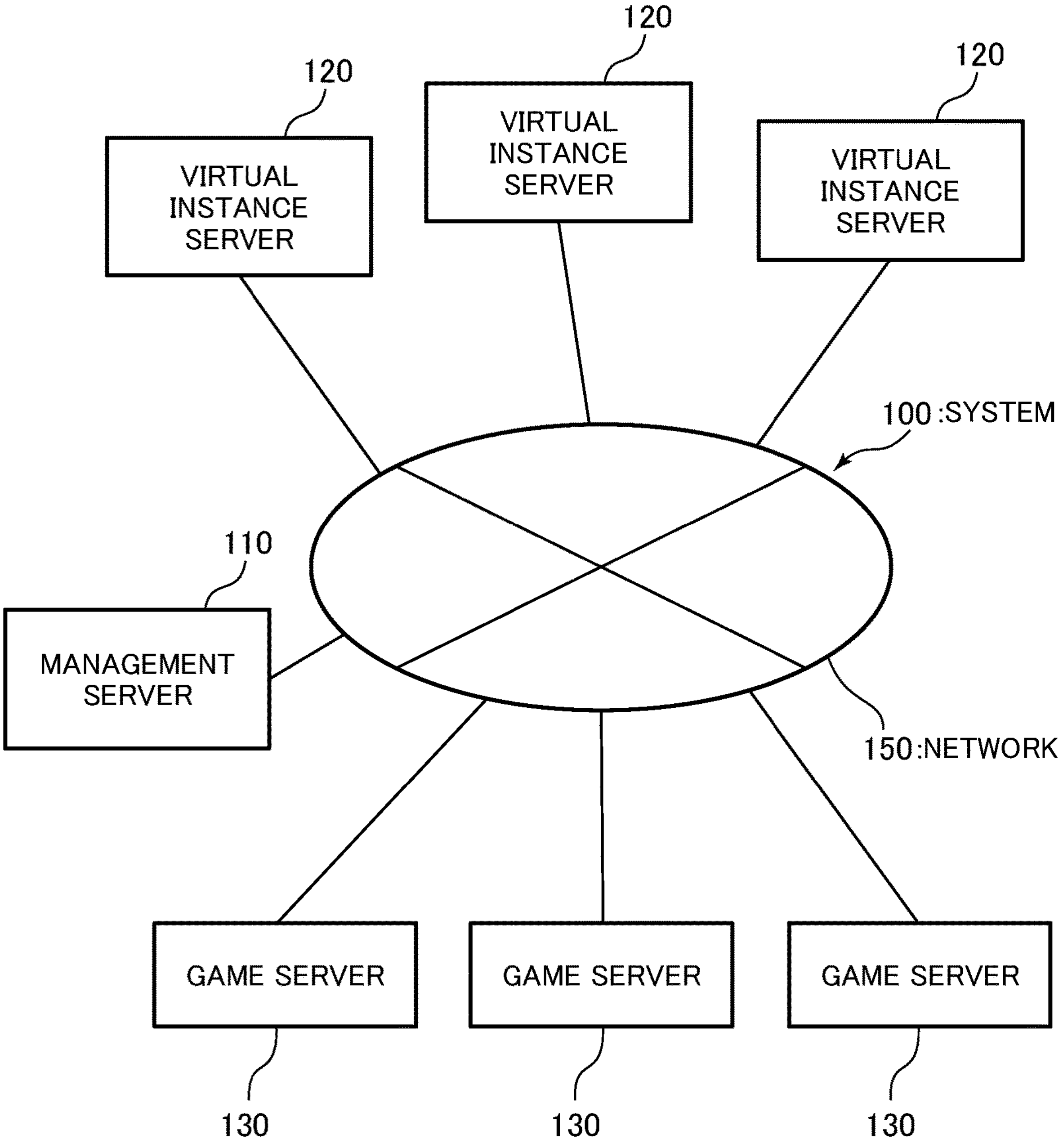
FIG. 1 shows the configuration of a system according to one embodiment of the present invention.

One embodiment of the present invention will be described below with reference to the drawings. As shown in FIG. 1, a program verification system 100 according to this embodiment can be realized by a system including a management server 110, virtual instance servers 120, and game servers 130 that are connected to one another via a network 150. In this embodiment, it is assumed that the virtual instance servers 120 constitute a server group including two or more servers and the game servers 130 constitute a server group including two or more servers. However, it is also acceptable that there is only one virtual instance server 120 and only one game server 130. The game in the present invention is a collaborative game that is advanced by a player in collaboration with another player. It is assumed that the game in this embodiment is a battle game in which a player fights a battle against another player. The game can also be a game in which a plurality of players fight a battle against a common non-player character.

Figure 2:
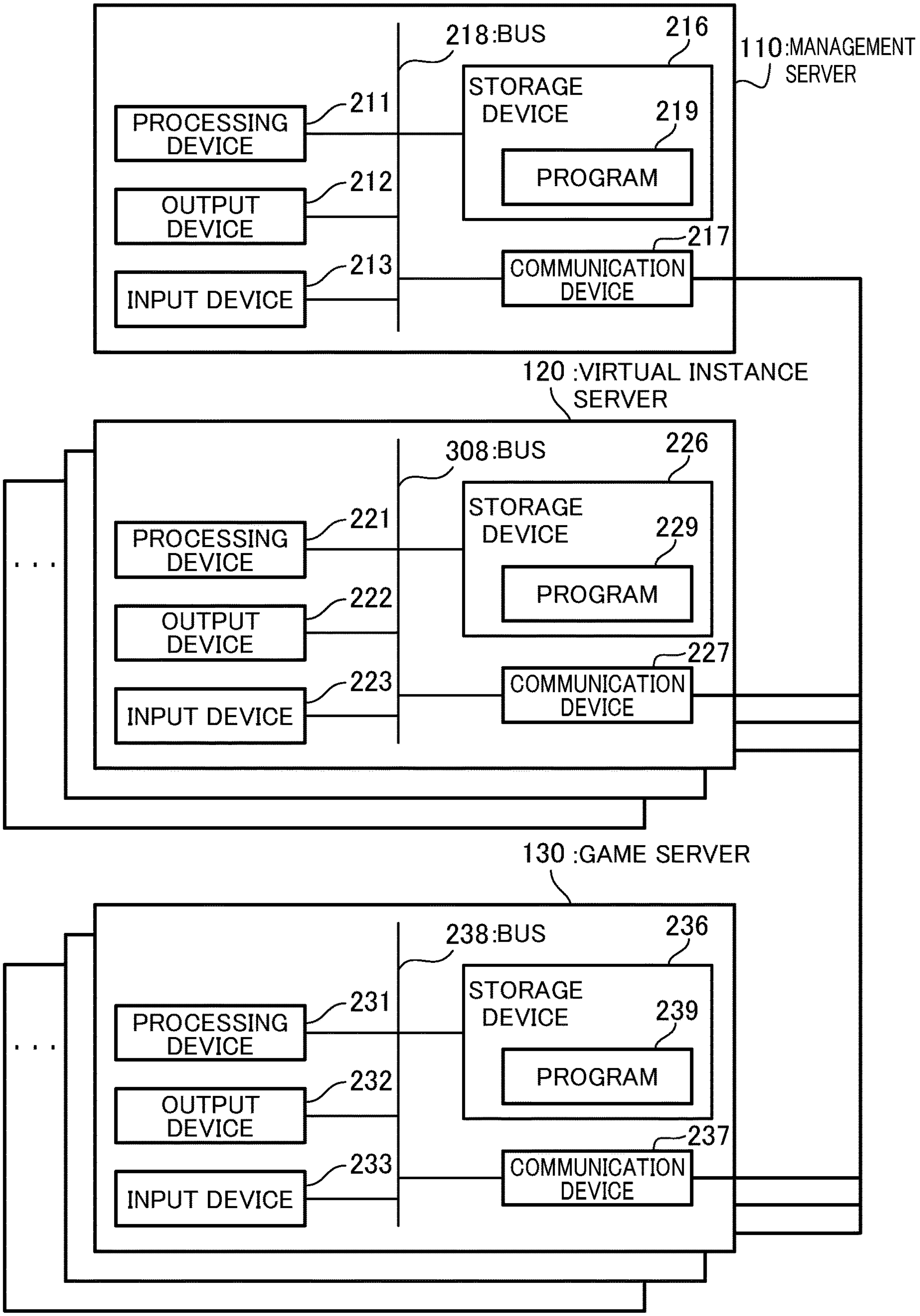
FIG. 2 is a hardware configuration diagram of the system according to one embodiment of the present invention.

FIG. 2 is a block diagram showing the hardware configurations of the management server 110, a virtual instance server 120, and a game server 130 according to this embodiment. The management server 110, the virtual instance server 120, and the game server 130 are devices capable of verifying a game program while communicating with one another via the network 150 and, as shown in FIG. 2, can include: processing devices 211, 221, and 231, respectively; output devices 212, 222, and 232, respectively; input devices 213, 223, and 233, respectively; storage devices 216, 226, and 236, respectively; communication devices 217, 227, and 237, respectively; and buses 218, 228, and 238, respectively. Programs 219, 229, and 239 are stored in the storage devices 216, 226, and 236, respectively. The game program includes game programs executed on a user terminal, a virtual instance, and a game server. Programs may be referred to as applications.

The processing devices 211, 221, and 231 execute various types of processing on the basis of: the programs 219, 229, and 239; input data from the input devices 213, 223, and 233 or data received from the communication devices 217, 227, and 237; and the like. The processing devices 211, 221, and 231 include processors for controlling the devices provided in the management server 110, the virtual instance server 120, and the game server 130, respectively, and execute various types of processing by using, as work areas, registers included in the processors and the storage devices 216, 226, and 236.

These constituent units are connected to one another via the buses 218, 228, and 238, but may be connected individually as needed. The output devices 212, 222, and 232 display screens and output sounds according to control performed by the processing devices 211, 221, and 231. The input devices 213, 223, and 233 are devices, such as keyboards, touchscreens, touch pads, and input buttons, having a function for accepting an input from a user.

The storage devices 216, 226, and 236 each include a main memory, a buffer memory, and a storage and are storage devices provided in a general computer, typified by a storage device using a RAM (volatile memory) or a flash memory (nonvolatile memory), such as an eMMC, a UFS, and an SSD, as well as a magnetic storage device. The storage devices 216, 226, and 236 can include external memories. The communication devices 217, 227, and 237 execute wireless communication such as mobile communication and wireless LAN communication, as well as wired communication by using an Ethernet® cable, a USB cable, etc.

In this embodiment, it is assumed that each of the game servers 130 is a clone having a configuration as similar as possible to the configuration of a game server that, when players actually play a game, is accessed and used by user terminals (not shown) to execute the game. Instead of this, an actual game server may also be used.

The programs 239 stored in the storage device 236 of the game server 130 include the game program for a server used for players to actually execute the game. The programs stored in the storage device 226 in the virtual instance server 120 include a program that runs in the same manner as the game program (game application) executed on a user terminal and also include other programs used to verify the game program. The storage device 216 in the management server 110 stores the programs 219 and 229 used for program verification.

Figure 3:
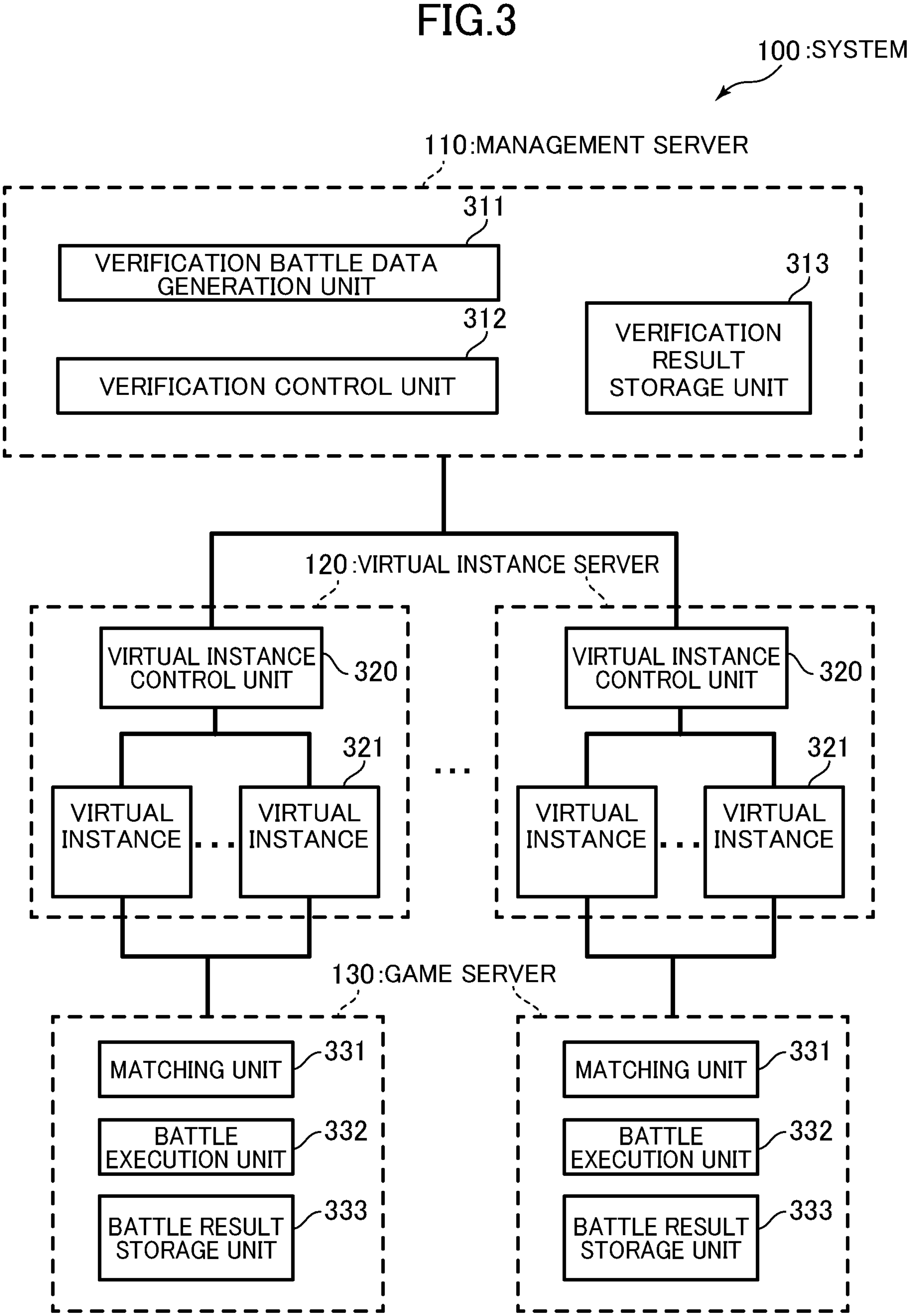
FIG. 3 is a functional block diagram of the system according to one embodiment of the present invention.

FIG. 3 shows an example of a functional block diagram of the system 100 according to the present invention. The management server 110 includes a verification battle data generation unit 311, a verification control unit 312, and a verification result storage unit 313. Each of the virtual instance servers 120 includes a virtual instance control unit 320 and a plurality of virtual instances 321, and each of the game servers 130 includes a matching unit 331 for matching a pair of virtual instances and a battle execution unit 332 for executing a battle in the matched pair of virtual instances. In another embodiment, any of the servers may have any of the functional units. For example, the management server 110 can have the virtual instance control unit 320 and the virtual instances 321. In addition, one server can have all of the functional units.

In this embodiment, the verification system 100 is a system for verifying a game program for a game in which a player fights a battle against another player by using a deck including a plurality of game media. In the battle, the players fight a battle against each other using their own decks. A deck is configured to include at least one card as a game medium. A deck combination is a combination of decks used to execute a single battle. For example, when a player A and a player B fight a battle, the player A's deck A and the player B's deck B constitute a single deck combination. A deck set is a set of decks to be verified when the game program is verified, and a deck combination set includes a plurality of deck combinations to be verified.

The verification battle data generation unit 311 determines verification battle data to be used to verify the game program. In this embodiment, the verification battle data includes a deck set and a deck combination set to be verified. The deck set can include all decks that can be composed on the basis of all cards to be verified, and the deck combination set can include all possible deck combinations. The verification battle data can be generated on the basis of data input to the management server by a game system administrator who manages the game system.

In this embodiment, the game system administrator inputs information about all cards, including newly added cards, to the management server 110 for examination. The verification battle data generation unit 311 of the management server 110 generates verification battle data including all decks configurable on the basis of this data, as well as deck sets for deck combinations and deck combination sets. Only some cards may be subject to verification, and only some deck combinations may be subject to verification. In a modification, the game system administrator may input all deck sets to be verified, or alternatively, the game system administrator may input deck sets and deck combination sets. The verification battle data includes, for example, deck set data as shown in Table 1 and deck combination set data as shown in Table 2.

TABLE 1

| Deck identification number | Card identification number | | |
|---|---|---|---|
| 1 | 213 | 512 | 392 |
| 2 | 099 | 891 | 756 |
| 3 | 840 | 202 | 571 |
| . . . | . . . | . . . | . . . |

TABLE 2

| Deck combination identification number | Deck identification number | |
|---|---|---|
| 1 | 134 | 51 |
| 2 | 23 | 55 |
| 3 | 65 | 42 |
| . . . | . . . | . . . |

In this embodiment, it is assumed that: a deck is composed of three cards; and one battle is executed between two players. Players, each using one deck, fight a battle against each other, and the single battle is executed using a single deck combination composed of two decks.

In Table 1, the card identification numbers of three cards constituting a deck are associated with a deck identification number. The card identification number of a card is a number used to identify the type of the card as a game medium. For example, Table 1 shows that the deck identified by deck identification number 1 is composed of three cards with card identification numbers 213, 512, and 392.

In Table 2, two deck identification numbers identifying respective decks are associated with a deck combination identification number. The deck combination identification number of a deck combination is an identification number for identifying the deck combination. In this verification system, it is assumed that all deck combinations included in the deck combination set data are verified. It is assumed that a completion condition for verification for each of the deck combination identification numbers is satisfied by one execution of a battle with that deck combination. If a battle needs to be executed a plurality of times with the same deck combination, a plurality of deck combination identification numbers can be generated for the same deck combination. It is also acceptable that a completion condition specifying a predetermined number of times is stored in association with each of the deck combination identification numbers, so that the completion condition for the deck combination identification number is satisfied when a battle is executed the predetermined number of times or more.

The verification control unit 312 can execute battles in a first mode until a predetermined verification coverage is reached and can then execute battles in a second mode after the predetermined verification coverage is reached.

Executing battles in the first mode can include: placing, into battle startable states (collaborative-game startable states), the game states of virtual instances that are each assigned a deck included in a deck set; determining whether or not a predetermined verification coverage has been reached on the basis of a battle result (collaborative game result) and a deck combination set, i.e., the battle result that is generated when a battle is executed by using the virtual instances in each of a plurality of pairs of virtual instances determined for battle execution from the virtual instances placed into the battle startable states and that includes the deck combination used in the battle; and repeating the execution of placing the game states of virtual instances into the battle startable states and determining whether or not the predetermined verification coverage has been reached until it is determined that the predetermined verification coverage has been reached.

The verification coverage indicates a rough number of targets that have been verified among all targets to be verified. In this embodiment, it is assumed that a verification completion rate is used as the verification coverage, and the verification completion rate is the ratio of the number of completed executions with respect to the total number of executions to be verified.

For example, in the case where one execution is run for one deck combination identification number, the verification completion rate can be obtained by dividing the number of deck combination identification numbers for which executions have been completed by the total number of deck combination identification numbers to be verified. In the case where executing a plurality of battles with a single deck combination is set as the verification completion condition for the deck combination, the verification completion rate can be a value obtained by dividing the number of executed battles by the number of battles to be executed. It is preferable, however, that if more battles than the number of times set as the verification completion condition for the deck combination are executed, the number of times set as the verification completion condition be regarded as the number of executions.

Executing a battle in the second mode can include: determining pairs of virtual instances for battle execution; assigning each of the decks in the unverified deck combinations determined on the basis of the deck combination set and the battle results to each of the determined virtual instances; and placing the game states of the determined pairs of virtual instances into the battle startable state one by one at predetermined time intervals. A pair of virtual instances that have been placed into the battle startable state for battle execution may be determined as a pair for battle execution during the predetermined time interval.

Whether or not verification for a deck combination has been completed can be determined by whether or not the verification completion condition for that deck combination is satisfied. In this embodiment, it is assumed that executing one battle for the deck combination identification number assigned to a deck combination is set as the completion condition for the deck combination. However, it is also acceptable that executing a number of battles equal to or more than the predetermined number determined for each of the deck combination identification numbers is set as the completion condition for that deck combination identification number.

A battle by using virtual instances may be executed on the basis of a learning model pre-generated from the history of plays that were actually executed by players. This makes it possible to verify battles based on behaviors similar to those taken by actual players, though the verification is based on battles between non-player characters.

The verification result storage unit 313 stores battle results of battles executed using the battle execution unit 332 and virtual instances 321. It is assumed that the battle results are stored in a battle result storage unit 333 of the game server 130, the virtual instance control unit 320 monitors the battle results, and when there is an update, the virtual instance control unit 320 retrieves the battle results and transmits them to the management server 110. The battle results include data as to whether a battle ended normally or abnormally, which deck was used by the virtual instance as the winner, etc.

In a modification, when a battle ends, a virtual instance 321 may acquire the battle result and transmit the battle result to the management server 110 via the virtual instance control unit 320. In another modification, the virtual instance control unit 320 may transmit the battle result to an external data server (not shown in the figure), which may then store the battle result in a database, so that the management server 110 can access the database to acquire the battle result. The battle result may be transmitted from the game server 130 to the data server.

It is assumed that the virtual instance control unit 320 generates, according to a control signal from the verification control unit 312, a plurality of virtual instances for virtualizing either user terminals in which games are played or the software environments of the user terminals and assigns a deck to each of the virtual instances 321 to place the game state of each of the virtual instances 321 into the battle startable state.

Each of the virtual instances 321 is a virtual instance for virtualizing a user terminal or the software environment of the user terminal and can be realized by using a virtualization technology called a "container", such as Docker®, at the operating system level. Docker® can control a Linux container provided by the Linux® kernel, thereby realizing virtualization on a process-by-process basis, i.e., providing a space isolated from another process in terms of the use of the CPU and the file system. Because the containers are isolated from one another, the game application can behave as if it were the only game application running on the operating system. Therefore, the execution of the game application on a user terminal can be realized virtually by executing the game application in each container and starting the process of the game application. Therefore, it is possible to generate a plurality of virtual instances on a single server device and execute a plurality of game applications simultaneously and concurrently in an isolated manner from one another, thus generating results for verification. In this embodiment, "containers" in Docker® are used as the virtual instances 321.

In this embodiment, battle processing for verification using a virtual instance 321 is executed by running, in autopilot and in a headless mode, the game application that is executed to play the game on a user terminal. In this embodiment, the headless mode is a mode in which graphic processing that accesses the GPU is disabled, sound processing that accesses the sound source chip is disabled, and accessing an external server is disabled. This allows the game to run in a state in which only the CPU, memory, and secondary storage device are used, i.e., in such a manner as to access only the resources enclosed inside the container, thus eliminating rate-limiting factors (factors that determine the speed) such as the speed of processing animations, which are assumed to be viewed by humans, and the speed of playing back audio, which is assumed to be heard by humans. In addition, because these graphic devices and sound devices are generally implemented as external devices outside the CPU, the headless mode can also reduce the waiting time for synchronization required for I/O processing between the CPU and these external devices. This makes it possible to run the game at high speed with no wait processing, which depends only on the processing speed of the CPU alone by eliminating wait processing required for presentation for humans and synchronization for external devices. Consequently, battle results can be generated in a short time.

Figure 4:
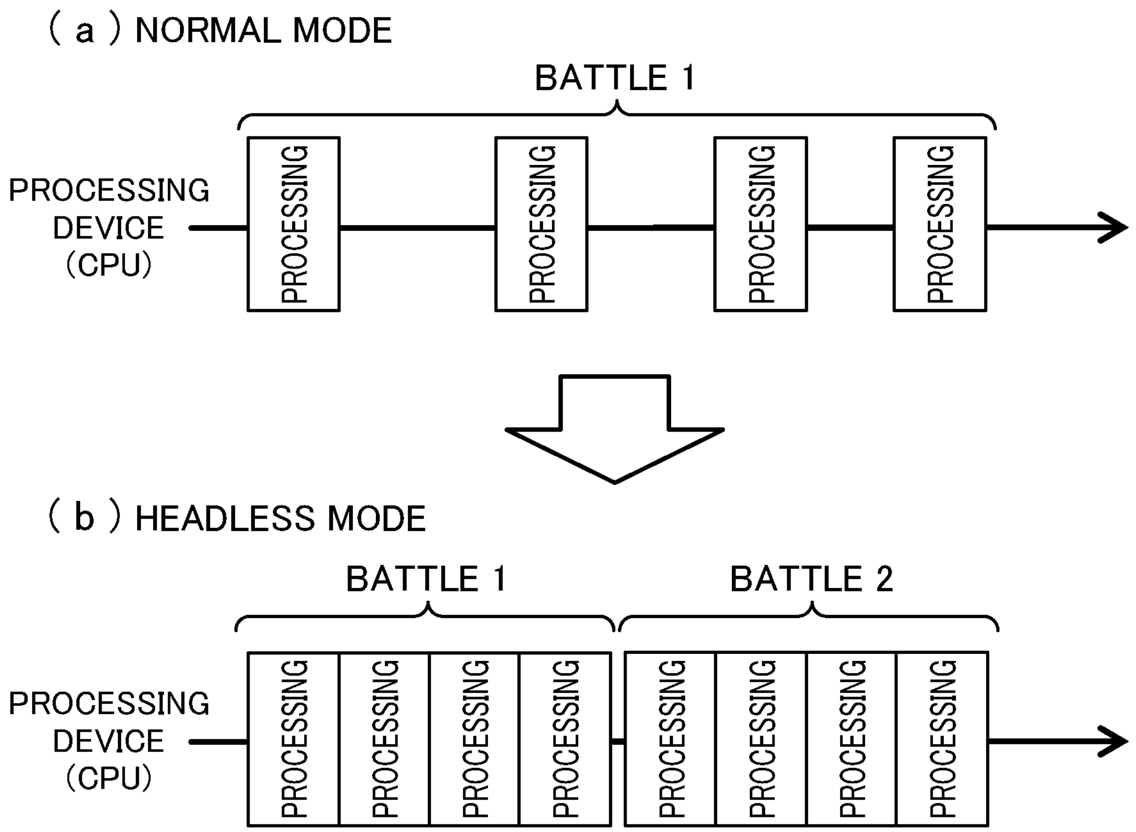
FIG. 4 is a schematic diagram of a headless mode according to one embodiment of the present invention.

This point will be explained in more detail using FIG. 4. FIG. 4(*a*) shows the operating state of the CPU in the case where a battle is executed in a normal mode, and FIG. 4(*b*) shows the operating state of the CPU in the case where battles are executed in the headless mode. As shown in FIG. 4(*a*), in the normal mode, the CPU is not always under high load but is locally under high load. These high-load portions correspond to, for example, portions in which data necessary for frame rendering of the game screen is generated. Also, since music and screen display need to be adjusted to human perception, a wait occurs until a predetermined timing is reached. Therefore, in the normal mode, the CPU is running locally while being rate-limited by the real-time performance of the game progress. The headless mode, on the other hand, does not require the GPU and sound, which act as rate-limiting elements, thus allowing the CPU alone to execute events at high speed, i.e., in a short period of time without any waiting. This makes it possible to execute processes, which were conventionally distributed, all together in a short period of time and to generate a plurality of battle results in a time period equivalent to a single-battle execution period in the normal mode, thus realizing high processing efficiency.

In the present invention, executing a game program in the headless mode can be either executing the game program in the headless mode or executing a headless game program. Any form of execution is acceptable as long as the game can be made to proceed in a headless state. In Unity, which is a widely used game engine, it is possible to easily generate a headless game program merely by selecting the headless mode from the GUI. In other words, the game program for the user terminal can be re-used to easily prepare a game program for verification. In another embodiment, the game program may be executed in the normal mode, not in the headless mode.

The matching unit 331 of the game server 130 selects a pair of virtual instances to be matched from among the virtual instances 321 the game states of which have been placed into the game startable state. Verification can be performed in a state close to the actual environment by executing matching processing in the same manner as processing executed by the game server to match actual user terminals. For example, pairs of virtual instances may be matched randomly on the basis of random numbers from among a plurality of virtual instances that have been placed into the game startable state, or pairs of virtual instances may be matched in the order in which the virtual instances have been placed into the game startable state. Alternatively, pairs of virtual instances may be matched on the basis of priorities associated with the respective virtual instances. Priorities may be assigned to, for example, virtual instances or to decks assigned to virtual instances. Virtual instances 321 running on the virtual instance servers 120 associated with the same game server 130 are matched with each other.

The battle execution unit 332 executes a battle using the decks assigned to the matched pair of virtual instances 321 and stores the battle result in the battle result storage unit 333 along with the status “battle in progress”, “battle is over”, or the like.

In this embodiment, the management server 110 starts a plurality of virtual instance servers 120 in connection with one of the game servers 130. The game program running by using virtual instances 321 accesses the game server 130 associated with the virtual instance server in which the relevant virtual instances are running. By operating a virtual instance server and a game server in association with each other as described above, it is possible to configure a minimum set of environments that simulate a battle between players as a pair consisting of the virtual instance server and the game server, so that any number of these pairs can be started in a scalable manner.

In this embodiment, the functional units are realized as a result of the programs included in the hardware configurations shown in FIG. 2 being executed by the processing devices and as a result of the hardware of the output devices, input devices, storage devices, and communication devices being operated in cooperation with the software. However, the functional units may also be realized in the form of electronic circuits, etc. implemented so as to correspond to the respective functions.

Next, the operation of the system 100 according to this embodiment will be described using FIGS. 5 to 10. In this embodiment, a game program for a game in which players, each using a deck including a plurality of game media, fight a battle against each other is verified. First, as described above, when the game system administrator creates data including information for all cards to be verified and inputs the data into the management server 110, the verification battle data generation unit 311 generates verification battle data, including deck set data and deck combination set data, as shown in Tables 1 and 2, and inputs the data into the verification control unit 312.

Upon receiving the verification battle data, the verification control unit 312 transmits, to at least one virtual instance control unit 320, a virtual instance generation signal for generating a virtual instance. Upon receiving the virtual instance generation signal, the virtual instance control unit 320 generates a plurality of virtual instances 321. The virtual instance control unit 320 may generate virtual instances autonomously without a control signal from the verification control unit 312.

Figure 5:
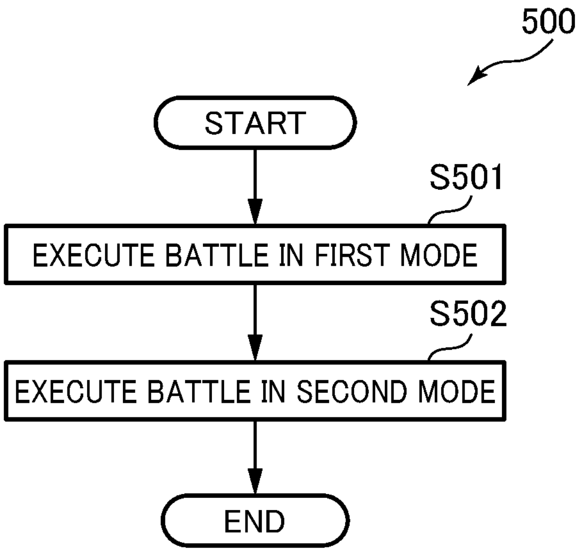
FIG. 5 is a flowchart of information processing according to one embodiment of the present invention.

When a plurality of virtual instances are generated, a battle execution process 500 for game program verification, shown in FIG. 5, is started. First, the battle execution process in the first mode (S501) is executed, and the battle execution process in the second mode is then executed (S502). In the first mode, battles are repeatedly executed as concurrently as possible by using all virtual instances, without specifying a combination of decks to be used in the battles, until a predetermined verification coverage is reached. Then, when the predetermined verification coverage is reached, the system transitions to the second mode and continues to execute battles sequentially by specifying deck combinations to be used in the battles until the verification is completed.

It is preferable that the game server 130 be made to behave as similarly as possible to when the user actually executes the game. It is assumed that when the user actually executes the game, the user presses the game start button by operating the user terminal, and the game state of the game application that will run on the user terminal is then placed into the game startable state, whereby a matching request for executing a battle is sent to the game server. The game server matches players from whom matching requests have been received. It is assumed that at this time, the game server does not take into account a deck combination for the battle.

The matching unit 331 in the game server 130 used for verification in this embodiment executes processing in the same manner. That is, when the game states of virtual instances 321 are placed into the game startable state and matching requests are sent to the game server 130, the matching unit 331 matches, without considering a battle deck combination, the virtual instances 321 from which the matching requests have been received.

Here, in the first mode, it is assumed that the system repeats the process of: executing battles by placing, into the battle startable state in a batch, all virtual instances that can be placed into the battle startable states; and, when the battles are completed and virtual instances are placed into the battle startable state, executing battles by placing the virtual instances again into the battle startable state in a batch. Because virtual instances that have been placed into the battle startable state in a batch are matched without considering a deck combination, it is not possible to specify a deck combination for matching. Among virtual instances that can be placed into the game startable state at the stage of executing processing for placing virtual instances into the battle startable state, the game server may match virtual instances on the basis of random numbers, on a first-come, first-served basis, or on the basis of priorities associated with the respective virtual instances.

In order to place, into the battle startable state in a batch, all virtual instances that can be placed into the battle startable state, it is not necessary to place, into the battle startable state in a batch, all of the virtual instances that have been generated. It is sufficient to place, into the battle startable state, virtual instances that can be placed into the battle startable state at the time of batch processing. Also, batch processing does not need to be strictly a batch. It is assumed that batch processing includes processing for sequentially placing, into the battle startable state, virtual instances that can be placed into the battle startable state. However, unlike in the second mode described below, batch processing does not include the control of placing, at predetermined time intervals, only a desired pair of virtual instances into the battle startable state so as to match the desired pair of virtual instances.

Figure 6:
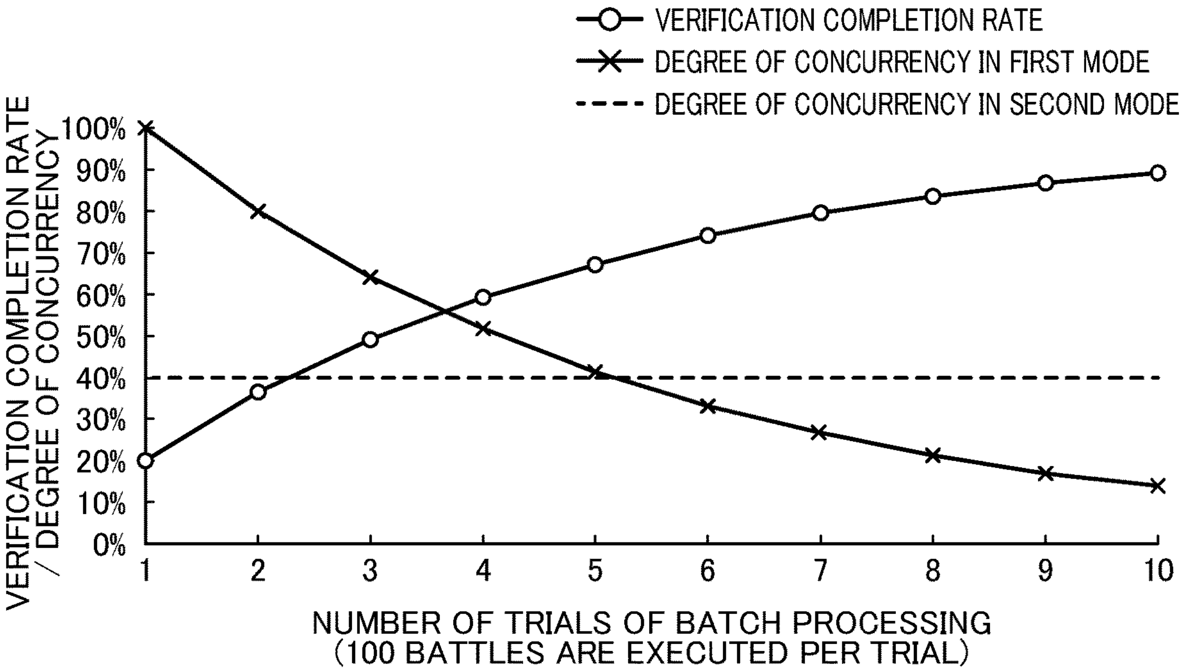
FIG. 6 is a diagram showing an example of transition in verification completion rate according to one embodiment of the present invention.

FIG. 6 shows an example of transition of the verification completion rate with respect to the number of trials of batch processing for placing all virtual instances into the battle startable state in a batch. Here, it is assumed that a deck combination set including 500 combinations is to be verified, 200 virtual instances are generated, and 100 battles are executed in one trial of batch processing. It is assumed that, for the sake of understanding, the time required for a single battle is the same regardless of the deck combination, but this embodiment can be run even if the times required for battles differ depending on the deck combination, etc. The degree of concurrency is the percentage of virtual instances that are executing unverified battles with respect to the virtual instances that have been generated. The higher the degree of concurrency, the more efficiently the verification is executed.

In the first mode, there are no deck combinations for which verification has been completed in the first trial of batch processing. Therefore, the degree of concurrency is high at the beginning of verification, and the verification completion rate increases with the number of battles executed. In the second and subsequent trials of batch processing, battles using the same deck combination as the one used in the first trial of batch processing may be executed in duplicate. Therefore, the degree of concurrency gradually decreases, and the amount of increase in the verification completion rate also gradually decreases.

In the second mode, a pair of virtual instances that are assigned respective decks in a desired deck combination are placed into the battle startable state at predetermined time intervals for a single game server 130, whereby only the pair of virtual instances are placed into the battle startable state at predetermined time intervals. Thus, because matching of that one pair of virtual instances is performed in the game server 130, the game server 130 can verify the desired deck combination.

In this case, the utilization rate of the virtual instances will be lower in the second mode than in the first mode because a waiting time of the predetermined time interval occurs. However, because only deck combinations for which verification has not been completed can be verified in the second mode, the degree of concurrency is constant regardless of the verification completion rate, and the degree of concurrency does not decrease even though the verification completion rate increases. As an example, it is assumed that the degree of concurrency is 40% when verification battles are executed in the second mode.

In this embodiment, it is assumed that execution of battles is started in the first mode, and thereafter the first mode is switched to the second mode when the degree of concurrency in the first mode decreases as the number of trials of batch processing increases and reaches the degree of concurrency in the second mode. It is assumed that the first mode is switched to the second mode, for example, at a timing at which the verification completion rate=70%, which corresponds to the number of trials of batch processing with which the degree of concurrency in the first mode reaches 40%, which is the degree of concurrency in the second mode. By doing so, verification can be completed efficiently as a whole by using the first mode at the beginning of the verification in order to complete the verification at a high degree of concurrency and then switching to the second mode at the timing at which the degree of concurrency decreases in order to prevent a further decrease in the degree of concurrency.

Figure 7:
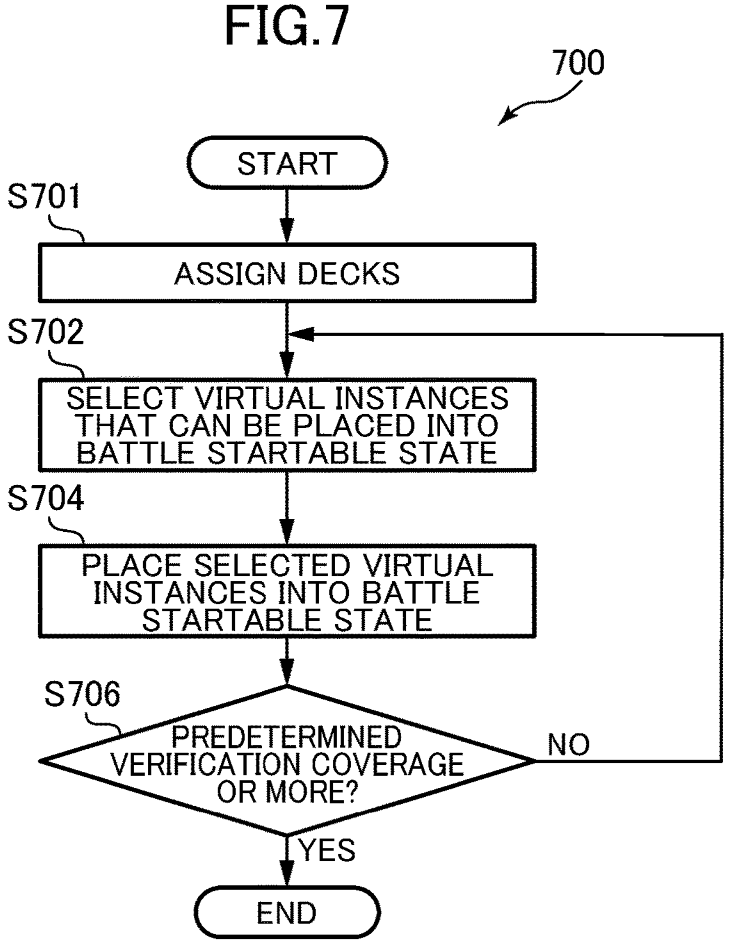
FIG. 7 is a flowchart of information processing according to one embodiment of the present invention.
Figure 8:
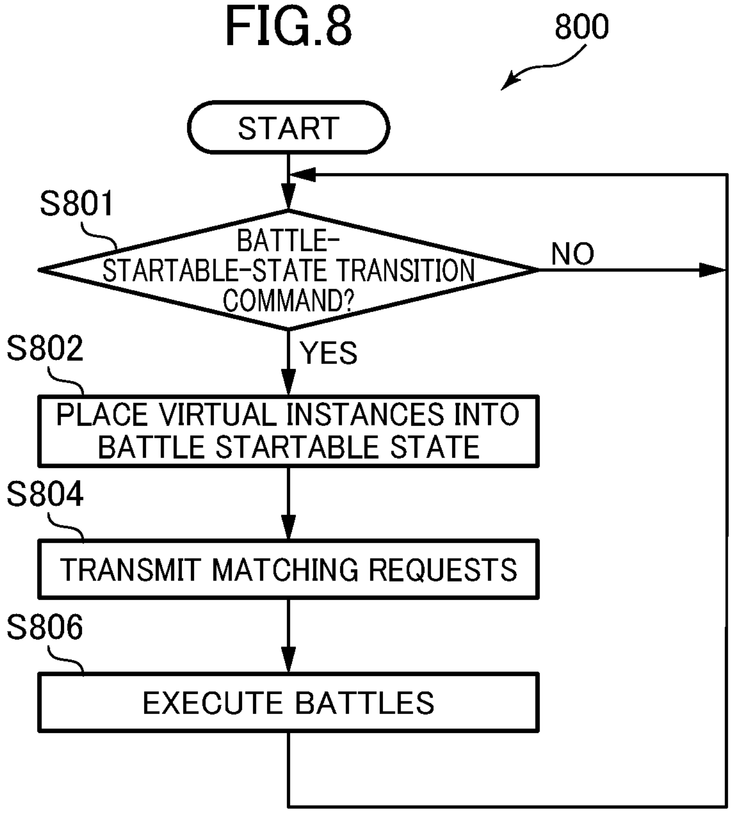
FIG. 8 is a flowchart of information processing according to one embodiment of the present invention.
Figure 9:
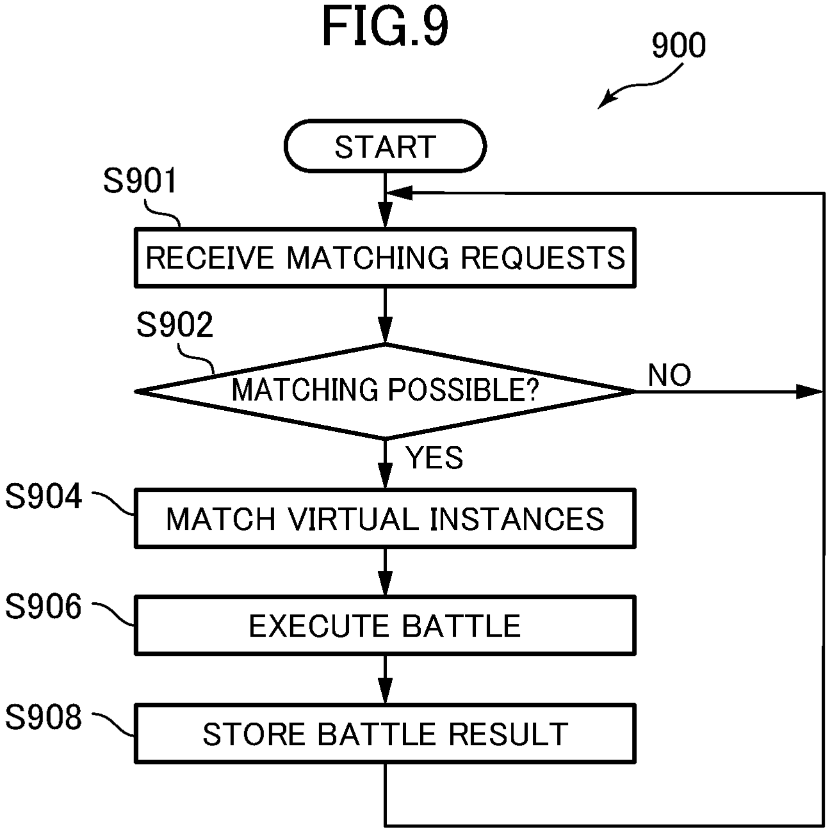
FIG. 9 is a flowchart of information processing according to one embodiment of the present invention.

FIGS. 7 to 9 show more detailed flowcharts of processing executed in the management server 110, the virtual instance server 120, and the game server 130 in the first mode in this embodiment.

In this embodiment, first, the verification control unit 312 assigns a deck selected from a deck set to each virtual instance (S701). The deck assignment may be performed by any method. For example, deck assignment may be performed randomly on the basis of random numbers or sequentially in the order of the deck identifier. Alternatively, matching may be performed on the basis of priorities associated with the respective virtual instances.

Then, the verification control unit 312 selects virtual instances 321 that can be placed into the battle startable state (S702). A virtual instance 321 while, for example, executing a battle is not in a game state that can be placed into the battle startable state. Therefore, for example, if no battle result is generated after a battle has been executed, it means that the battle is being executed, and thus it can be determined that the virtual instance is not in a game state that can be placed into the battle startable state. Alternatively, the virtual instance control unit 320 may manage the game state of each of the virtual instances 321 and transmit a signal for notifying the verification control unit 312 of the game state. For example, it is also acceptable that the game state takes one of the following states: a standby state, which indicates that the virtual instance can be placed into the battle startable state; a battle startable state; and an in-battle state, so that these game states can be managed by the verification control unit 312 or the virtual instance control unit 320. It is assumed that the in-battle state indicates that a battle is being executed, the battle startable state indicates that a battle can be started, the standby state indicates that the virtual instance can be placed into the battle startable state, and when a battle ends, the game state transitions to the standby state.

The verification control unit 312 places, into the battle startable state, the selected virtual instances, which can be placed into the battle startable state (S704). For example, the verification control unit 312 transmits, to the virtual instance control unit 320, a control signal for placing a virtual instance into the battle startable state, and the virtual instance control unit 320 then places the virtual instance into the battle startable state. It is assumed that selecting virtual instances that can be placed into the battle startable state and placing those virtual instances into the battle startable state are done by selecting all virtual instances that can be placed into the battle startable state and placing those virtual instances into the battle startable state.

The virtual instance server 120 waits for a battle-startable-state transition command from the management server 110 (S801). Upon receiving the transition command, the virtual instance server 120 places the virtual instances 321 into the battle startable state (S802). The virtual instances 321 that have been placed into the battle startable state transmit matching requests to the game server 130 in order to start battles (S804). Battles are executed once the matching is completed (S806). The matching requests are transmitted to the game server 130 with which the virtual instance server 120 that will run the relevant virtual instances is associated.

The game server 130 receives the matching requests from the virtual instances 321 (S901) and determines whether or not the virtual instances can be matched (S902). Because the aim of this embodiment is to verify the game program for executing a battle between two players, it is determined that matching is possible if matching requests from two or more virtual instances are received.

When it is determined that matching is possible, two virtual instances are matched to form a pair (S904), and a battle is executed using the matched pair of virtual instances (S906). When matching is done, the matched deck combination is stored in the battle result storage unit 333 as a battle result, together with the status "battle in progress". And when the battle is over, a battle result is generated with the status "battle is over", and the battle result is stored in the battle result storage unit 333 together with the deck combination used in the executed battle (S908).

In the management server 110, when the selected virtual instances are placed into the battle startable state (S704), it is determined whether or not the predetermined verification coverage has been reached. In the management server 110, the battle results generated by the game server 130 are stored in the verification result storage unit 313. Then, the verification control unit 312 determines, on the basis of the verification battle data and the battle results stored in the verification result storage unit 313, whether or not the predetermined verification coverage has been reached. Here, it is assumed that the verification completion rate is used as the verification coverage.

Because battles are executed without specifying a deck combination in the first mode, there is a possibility that battles are executed with the same deck combination in duplicate. For this reason, it is assumed that when the verification completion rate is to be calculated, duplicated battle results based on the same deck combination are excluded. Also, battle results do not need to be based on only the data concerning the completed battles. Deck combinations with which battles are being executed may be used to calculate the verification completion rate.

If it is not determined that the predetermined verification coverage has been reached, the flow returns to S702, and battles are repeatedly executed. In this embodiment, it is assumed that decks are assigned to virtual instances only at the start of the first mode. In a modification, however, when virtual instances that can be placed into the battle startable state are selected (S702), decks may be assigned to the selected virtual instances.

When it is determined that the predetermined verification coverage has been reached, the battle execution process in the first mode (S501) ends, and the flow proceeds to the battle execution process in the second mode (S502).

Figure 10:
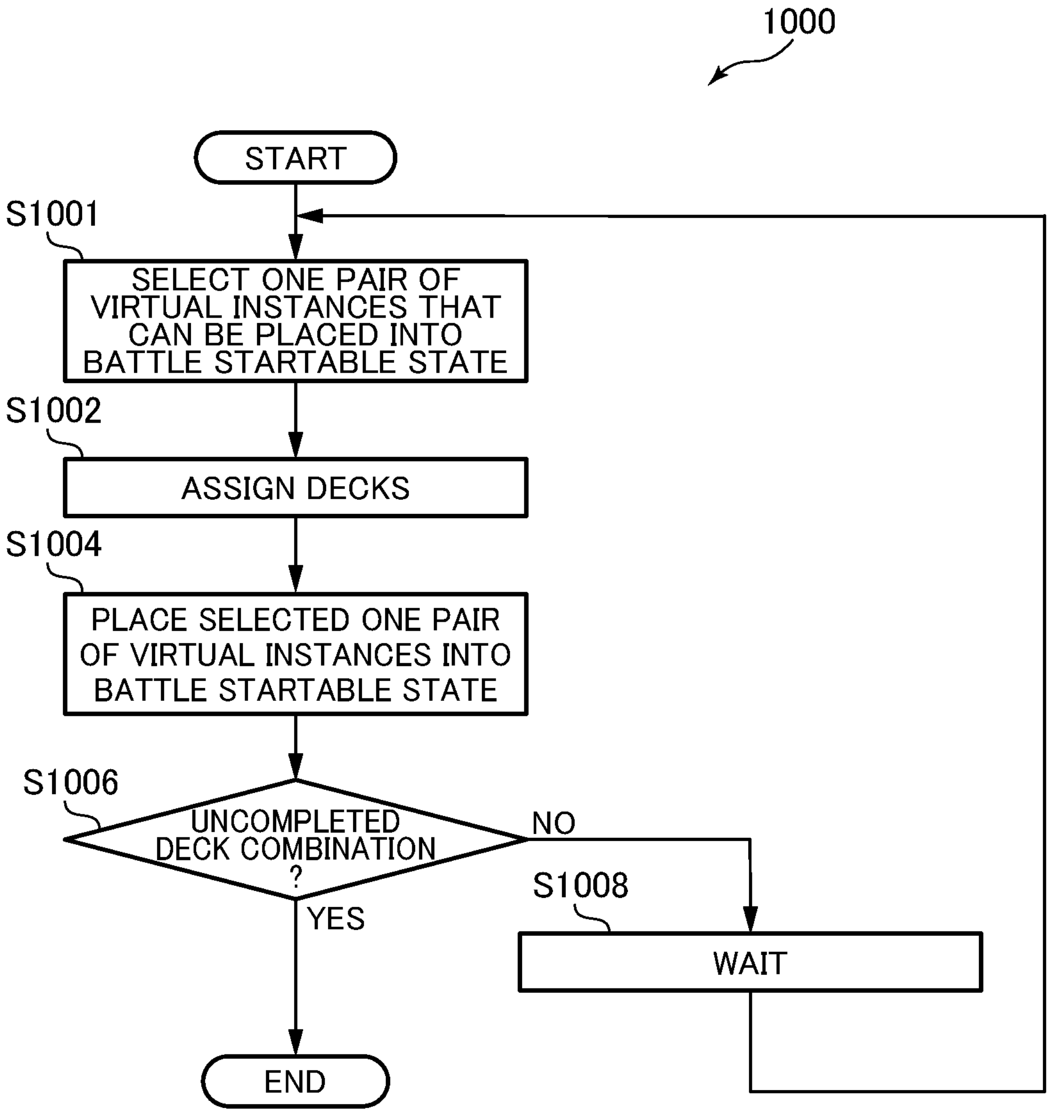
FIG. 10 is a flowchart of information processing according to one embodiment of the present invention.

FIG. 10 is a flowchart showing processing in the management server 110 in the second mode. In the second mode, the verification control unit 312 selects a pair of virtual instances from the virtual instances that can be placed into the battle startable state (S1001) and assigns decks to the selected one pair of virtual instances (S1002). The decks to be assigned here are decks that constitute one deck combination selected from the deck combinations for which verification has not been completed. In this embodiment, the verification control unit 312 can identify deck combinations for which verification has not been completed on the basis of the difference between the deck combination set included in the verification battle data and the deck combinations included in the battle results. It is preferable that the decks with the status "battle in progress" in the battle results be excluded from the deck combinations for which verification has not been completed. If a predetermined number of executions is set as the completion condition for one deck combination identification number, the number of executions for that deck combination identification number can be stored, so that the deck combination can be identified as a deck combination for which verification has not been completed until the predetermined number of executions is reached.

The one pair of virtual instances that have been selected and assigned respective decks are placed into the battle startable state (S1004). Then, it is determined whether or not verification for all deck combinations to be verified has been completed (S1006). If there is a deck combination for which verification has not been completed, the flow waits for a predetermined time (S1008) and then returns to S1001, in which processing for the next unverified deck combination is repeated until verification for all deck combinations is completed.

The flowchart showing processing in the virtual instance server 120 and the game server 130 is similar to that in the first mode. This processing will be described with reference to FIGS. 7 to 9 by omitting duplicated parts.

Upon accepting the battle-startable-state transition command from the management server 110 while waiting for it, the virtual instance server 120 places the virtual instances 321 into the battle startable state. The virtual instances 321 that have been placed into the battle startable state transmit matching requests to the game server 130 in order to start a battle, and execute a battle when the matching is completed (S801 to S806). The game server 130 receives the matching requests from the virtual instances 321 and matches the virtual instances (S901 to S904).

In this embodiment, after placing one pair of virtual instances into the battle startable state, the verification control unit 312 waits for a predetermined time period before placing the next pair of virtual instances into the battle startable state (S1008). For this reason, because matching requests are received from a pair of virtual instances in the game server 130, only this pair of virtual instances are eligible for matching, and this pair of virtual instances are thus matched. It is assumed that the waiting time in the verification control unit 312 is a time interval necessary for the game server 130 to match a pair of virtual instances. The virtual instance control unit 320, for example, may monitor whether or not a pair of virtual instances have been matched, and when confirming that a match has been made, the virtual instance control unit 320 may change the game state of the next pair of virtual instances.

In normal processing executed by the game server 130, users who can be matched without considering a deck combination are matched with each other. For this reason, if three or more matching requests are received in the game server 130, it is not possible to achieve matching so as to form a specific deck combination. In this embodiment, as described above, by performing control at the stage of matching processing so that only two virtual instances that have been assigned respective decks in a specific deck combination are eligible for matching, a battle with the desired deck combination can be executed without having to modify the programs in the game server 130 or the game application executed in the virtual instances.

When a battle is executed using the matched pair of virtual instances and is then completed, a battle result is generated. A battle result with the status "battle is over" is stored in the battle result storage unit 333 together with the deck combination used in the executed battle (S906, S908).

In the verification control unit 312, when it is determined that verification for all the deck combinations to be verified has been completed (S1006), battle processing in the second mode (S502) ends, and program verification processing ends.

The game system administrator can verify, on the basis of the generated battle results, the validity, etc. of the behavior of the game program with the deck combinations to be verified.

With this embodiment, it is possible to efficiently perform comprehensive verification of battles using a large number of deck combinations as a result of the game program on the game server and the game applications on user terminals performing communication in an actually operated manner. It is also possible to verify the game balance by calculating the win/loss ratios, classified by card or card combination, which is called KPI (Key Performance Indicator).

Because it is not necessary to implement special logic to perform battle simulation on the server side and the user terminal side, the game program can be easily verified. Also, the game simulation logic and the logic for managing simulation can be designed completely independently, and simulation can be managed without changing the game simulation logic.

By operating a virtual instance server and a game server in association with each other, a minimum set of environments for simulating a battle between players can be configured as a pair consisting of the virtual instance server and the game server. Furthermore, by starting any number of these pairs, a scalable verification system can be realized.

In the processing or operations described above, the processing or operations can be freely modified as long as no contradiction occurs. All processing may be executed by a single server or may be executed by a larger number of servers in such a manner as to be distributed among the servers.

Furthermore, the examples described above are merely for explaining the present invention, and the present invention is not limited to those examples. The present invention can be embodied in various forms as long as there is no departure from the gist thereof. The effects described in this embodiment are merely a list of the most preferable effects arising from the invention. The effects of the present invention are not limited to those described in this embodiment.

REFERENCE SIGNS LIST

100 Verification system
110 Management server
120 Virtual instance server
130 Game server
150 Network
211, 221, 231 Processing device
212, 222, 232 Output device
213, 223, 233 Input device
216, 226, 236 Storage device
217, 227, 237 Communication device
218, 228, 238 Bus
219, 229, 230 Program
311 Verification battle data generation unit
312 Verification control unit
313 Verification result storage unit
320 Virtual instance control unit
321 Virtual instance
331 Matching unit
332 Battle executing unit
333 Battle result storage unit

The invention claimed is:

1. A method comprising:

generating a plurality of virtual instances using a management server, wherein the plurality of virtual instances are generated by the management server over a network to virtualize one or more user terminals for playing a collaborative game implemented by a game program, wherein the plurality of virtual instances comprise a first virtualization container in a headless mode and a second virtualization container in a normal mode, wherein the first virtualization container has graphic processing disabled and sound processing disabled, and wherein the second virtualization container performs processing for a graphics processing unit (GPU) and a sound source chip;

executing the collaborative game in a first mode based on the game program and using a game server connected to the network and a plurality of game media to generate a deck combination set and a first plurality of collaborative game results, wherein the first mode comprises a first plurality of game applications that perform a first plurality of battles using the plurality of game media wherein the first plurality of game applications are executed simultaneously and concurrently in an isolated manner to generate the first plurality of collaborative game results, and wherein the collaborative game is executed in the first mode until a predetermined verification coverage is reached; and executing the collaborative game in a second mode based on the game program and using the game server after the predetermined verification coverage has been reached, wherein the second mode comprises a second plurality of game applications that are executed sequentially by specifying a plurality of deck combinations, wherein the management server selects the plurality of deck combinations to be used in a second plurality of battles in the collaborative game to generate a second plurality of collaborative game results, and wherein executing the collaborative game in the first mode comprises:

placing, into a collaborative-game startable state, a plurality of game states of virtual instances that are assigned decks included in a deck set, determining a first set of pairs of virtual instances from the plurality of virtual instances for executing the collaborative game from the plurality of virtual instances placed into the collaborative-game startable state, executing the collaborative game using the first set of pairs of virtual instances to generate a collaborative game result among the first plurality of collaborative game results including a deck combination that is used in the collaborative game, determining whether the predetermined verification coverage has been reached based on the deck combination set and the first plurality of collaborative game results, and wherein the collaborative game is repeatedly executed, in the first mode until the predetermined verification coverage is reached, and wherein executing the collaborative game in the second mode comprises:

determining a second set of pairs of virtual instances from the plurality of virtual instances for executing the collaborative game, assigning a plurality of decks from the plurality of game media in unverified deck combinations to the second set of pairs of virtual instances, wherein the unverified deck combinations are determined by the management server from the deck combination set and the first plurality of collaborative game results from executing the collaborative game in the first mode, placing a plurality of game states of the second set of pairs of virtual instances into the collaborative-game startable state, and executing the collaborative game using the second set of pairs of virtual instances to generate a collaborative game result among the second plurality of collaborative game results including the deck combination that is used in the collaborative game; and verifying, by the management server, whether the game program satisfies a software test using the first plurality of collaborative game results and the second plurality of collaborative game results.

2. The method according to claim 1, wherein one or more steps of executing the collaborative game in the first mode are based on a priority associated with the plurality of virtual instances.

3. The method according to claim 1, wherein executing the collaborative game in the second mode comprises:

placing the plurality of game states of the plurality of virtual instances at a plurality of predetermined time intervals; and determining at least one pair of the virtual instances among the second set of pairs of virtual instances during a predetermined time interval among the plurality of predetermined time intervals.

4. The method according to claim 1, wherein executing the collaborative game in the second mode is repeatedly executed until all deck combinations satisfy a verification completion condition.

5. The method according to claim 4, wherein the verification completion condition for a deck combination includes executing the collaborative game a predetermined number of times by using the deck combination.

6. The method according to claim 1, wherein the predetermined verification coverage is determined based on a verification completion rate obtained by dividing a number of times the collaborative game has been executed by a number of times the collaborative game should be executed, and if the collaborative game for a deck combination is executed more than the number of times specified in a verification completion condition for the deck combination, the number of times the collaborative game is executed is calculated as if the collaborative game were executed the number of times specified in the verification completion condition.

7. The method according to claim 1, wherein executing the collaborative game uses a learning model that is generated from play history of a player.

8. A system comprising:

a management server connected a network; and a game server connected to the management server over the network, wherein the management server is configured to perform a method comprising:

generating a plurality of virtual instances, wherein the plurality of virtual instances are generated to virtualize one or more user terminals for playing a collaborative game implemented by a game program, wherein the plurality of virtual instances comprise a first virtualization container in a headless mode and a second virtualization container in a normal mode, wherein the first virtualization container has graphic processing disabled and sound processing disabled, and wherein the second virtualization container performs processing for a graphics processing unit (GPU) and a sound source chip;

executing the collaborative game in a first mode based on the game program and using the game server connected to the network and a plurality of game media to generate a deck combination set and a first plurality of collaborative game results, wherein the first mode comprises a first plurality of game applications that perform a first plurality of battles using the plurality of game media wherein the first plurality of game applications are executed simultaneously and concurrently in an isolated manner to generate the first plurality of collaborative game results, and wherein the collaborative game is executed in the first mode until a predetermined verification coverage is reached;

executing the collaborative game in a second mode based on the game program and using the game server after the predetermined verification coverage has been reached, wherein the second mode comprises a second plurality of game applications that are executed sequentially by specifying a plurality of deck combinations, wherein the management server selects the plurality of deck combinations to be used in a second plurality of battles in the collaborative game to generate a second plurality of collaborative game results, and wherein executing the collaborative game in the first mode comprises:

placing, into a collaborative-game startable state, a plurality of game states of virtual instances that are assigned decks included in a deck set, determining a first set of pairs of virtual instances from the plurality of virtual instances for executing the collaborative game from the plurality of virtual instances placed into the collaborative-game startable state, executing the collaborative game using the first set of pairs of virtual instances to generate a collaborative game result among the first plurality of collaborative game results including a deck combination that is used in the collaborative game, determining whether the predetermined verification coverage has been reached based on the deck combination set and the first plurality of collaborative game results, and wherein the collaborative game is repeatedly executed in the first mode until the predetermined verification coverage is reached, and wherein executing the collaborative game in the second mode comprises:

determining a second set of pairs of virtual instances from the plurality of virtual instances for executing the collaborative game, assigning a plurality of decks from the plurality of game media in unverified deck combinations to the second set of pairs of virtual instances, wherein the unverified deck combinations are determined by the management server from the deck combination set and the first plurality of collaborative game results from executing the collaborative game in the first mode, placing a plurality of game states of the second set of pairs of virtual instances into the collaborative-game startable state, and executing the collaborative game using the second set of pairs of virtual instances to generate a collaborative game result among the second plurality of collaborative game results including the deck combination that is used in the collaborative game; and verifying whether the game program satisfies a software test using the first plurality of collaborative game results and the second plurality of collaborative game results.

9. A management server comprising:

a hardware processor; and a memory connected to the hardware processor, wherein the memory comprises a computer program configured to perform a method comprising:

generating a plurality of virtual instances, wherein the plurality of virtual instances are generated to virtualize one or more user terminals for playing a collaborative game implemented by a game program, wherein the plurality of virtual instances comprise a first virtualization container in a headless mode and a second virtualization container in a normal mode, wherein the first virtualization container has graphic processing disabled and sound processing disabled, and wherein the second virtualization container performs processing for a graphics processing unit (GPU) and a sound source chip;

executing the collaborative game in a first mode based on the game program and using a game server connected to a network and a plurality of game media to generate a deck combination set and a first plurality of collaborative game results, wherein the first mode comprises a first plurality of game applications that perform a first plurality of battles using the plurality of game media wherein the first plurality of game applications are executed simultaneously and concurrently in an isolated manner to generate the first plurality of collaborative game results, and wherein the collaborative game is executed in the first mode until a predetermined verification coverage is reached;

executing the collaborative game in a second mode based on the game program and using the game server after the predetermined verification coverage has been reached, wherein the second mode comprises a second plurality of game applications that are executed sequentially by specifying a plurality of deck combinations, wherein the management server selects the plurality of deck combinations to be used in a second plurality of battles in the collaborative game to generate a second plurality of collaborative game results, and wherein executing the collaborative game in the first mode comprises:

placing, into a collaborative-game startable state, a plurality of game states of virtual instances that are assigned decks included in a deck set, determining a first set of pairs of virtual instances from the plurality of virtual instances for executing the collaborative game from the plurality of virtual instances placed into the collaborative-game startable state, executing the collaborative game using the first set of pairs of virtual instances to generate a collaborative game result among the first plurality of collaborative game results including a deck combination that is used in the collaborative game, determining whether the predetermined verification coverage has been reached based on the deck combination set and the first plurality of collaborative game results, and wherein the collaborative game is repeatedly executed in the first mode until the predetermined verification coverage is reached, and wherein executing the collaborative game in the second mode comprises:

determining a second set of pairs of virtual instances from the plurality of virtual instances for executing the collaborative game, assigning a plurality of decks from the plurality of game media in unverified deck combinations to the second set of pairs of virtual instances, wherein the unverified deck combinations are determined by the management server from the deck combination set and the first plurality of collaborative game results from executing the collaborative game in the first mode, placing a plurality of game states of the second set of pairs of virtual instances into the collaborative-game startable state, and executing the collaborative game using the second set of pairs of virtual instances to generate a collaborative game result among the second plurality of collaborative game results including the deck combination that is used in the collaborative game; and verifying whether the game program satisfies a software test using the first plurality of collaborative game results and the second plurality of collaborative game results.

* * * * *